United States Patent
de M. Ferreira

(12) 
(10) Patent No.: US 6,319,629 B1
(45) Date of Patent: Nov. 20, 2001

(54) GLASS-FIBRE REINFORCED ABSORBENT SEPARATOR

(75) Inventor: Antonio L. de M. Ferreira, Nashua, NH (US)

(73) Assignee: Amer-Sil S.A., Kehlen (LU)

(*) Notice: Subject to any disclaimer, the term of this patent is extended or adjusted under 35 U.S.C. 154(b) by 0 days.

(21) Appl. No.: 09/549,607

(22) Filed: Apr. 14, 2000

Related U.S. Application Data

(63) Continuation of application No. PCT/EP98/06500, filed on Oct. 14, 1998.

(51) Int. Cl.⁷ .................................................. H01M 4/56
(52) U.S. Cl. ........................... 429/144; 429/225; 429/129
(58) Field of Search .................................. 429/225, 129, 429/142, 144

(56) References Cited

U.S. PATENT DOCUMENTS

| | | |
|---|---|---|
| 4,262,068 | 4/1981 | Kono et al. . |
| 4,529,677 * | 7/1985 | Bodendorf .................... 429/252 |
| 5,376,477 * | 12/1994 | Aidman et al. ................ 429/141 |

FOREIGN PATENT DOCUMENTS

| | | |
|---|---|---|
| 0 507 090 A1 | 10/1992 | (EP) . |
| 58-176866 | 10/1983 | (JP) . |
| WO 92/22705 | 12/1992 | (WO) . |

OTHER PUBLICATIONS

Patent Abstract of Japan, Publication No. 58176866, Publication Date Oct. 17, 1983.
Patent Abstract of Japan, Publication No. 63148535, Publication Date Jun. 21, 1988.

* cited by examiner

*Primary Examiner*—Gabrielle Brouillette
*Assistant Examiner*—M. Wills
(74) *Attorney, Agent, or Firm*—Oblon, Spivak, McClelland, Maier & Neustadt, P.C.

(57) ABSTRACT

The invention concerns an absorbing separator for lead-acid storage cells regulated by a valve, including a first glass fibre layer, a second glass fibre layer and a synthetic resin strip inserted between the first and second layers.

15 Claims, 1 Drawing Sheet

GLASS-FIBRE REINFORCED ABSORBENT SEPARATOR

This application is a Continuation of International No. PCT/EP98/06500 filed Oct. 14, 1998.

The present invention relates to absorbent separators, reinforced with fibres, for batteries, including lead-acid accumulators regulated by a valve.

Electrical lead-acid accumulators are used to store electric energy in chemical form.

This type of accumulator may be charged and discharged several times, some accumulators being capable of undergoing several hundred or even several thousand charge-discharge cycles before the quantity of electric energy supplied during discharge becomes too low. Normally, this threshold of electrical performance occurs at 80 per cent of the nominal capacity of the accumulator.

The maintenance of a traditional electrical lead-acid accumulator involves replacing the water lost by electrolysis or evaporation, particularly during the recharging cycle.

To eliminate this maintenance, an accumulator regulated by a valve has been developed, also known as a gas-recombination accumulator. This type of accumulator succeeds in reducing the losses of water considerably, thanks to the recombination of the oxygen which occurs in the accumulator towards the end of the recharging cycle.

Oxygen is formed on the positive plates towards the end of the recharging through the electrolysis of the water contained in the electrolyte. This gas fills the accumulator and migrates towards the negative plates. The oxygen is reduced on the surface of the said plates and is then incorporated in the electrolyte by a series of electrochemical reactions.

The reduction of the oxygen is possible because the accumulator is provided with a valve which prevents the oxygen escaping from the accumulator and which maintains a pressure slightly above atmospheric pressure inside the accumulator. This excess pressure inside the accumulator prevents atmospheric gases from entering the accumulator.

Establishing this internal recycling of the oxygen is possible only if the electrolyte is immobilised and if the gases find empty spaces through which they can circulate. The two methods of immobilising the electrolyte are:

gelation of the electrolyte with silica, using absorbent separators which retain the electrolyte.

Accumulators regulated by a valve incorporate flexible porous separators which are placed between the plates of opposite polarity. The separators absorb and retain the acid liquid electrolyte so that substantially all the electrolyte is absorbed into the pores of the separators and so that only a very thin film of electrolyte is present on the plates of the accumulators. The separators hold the electrolyte near the plates irrespective of the position of the accumulator.

The degree of saturation of the pores in the absorbent separator by the electrolyte should not exceed 95 per cent since free spaces are necessary so that the oxygen can pass through the separator, going from the positive plates where it is formed to the negative plates where it is consumed by reduction and reincorporated in the electrolyte by a series of electrochemical reactions.

The absorbent separators play a very important role in the recycling of the oxygen since, by immobilising the electrolyte in their pores, they allow access by the oxygen to the surfaces of the negative plates, where this gas is reduced by electrochemical reactions.

Traditionally, the construction of the absorbent separator is based on glass microfibres having a high resistance to oxidation. The glass microfibres are rapidly and completely saturated by the electrolyte (sulphuric acid) when the battery is filled.

Various mixtures of fibres have been used in the past, for example mixtures of coarse glass fibres and fine glass fibres with or without organic fibres. The fibres are used in such proportions that they hold a sufficient quantity of electrolytes. Thus, the U.S. Pat. No. 4,465,748 describes glass fibre separators comprising between 5 and 35 per cent by weight of glass fibres with a diameter of less than 1 micron, the remaining fibres having greater diameters.

The physical and mechanical properties of absorbent fibrous separators with glass microfibres depend largely on the fine microfibre content and also on the method of depositing these fibres.

One of the desirable properties in this type of separator is the possibility of welding it and of allowing the formation of pockets enveloping the plates. Welding of the separators is possible thanks to the use of synthetic fibres mixed with glass microfibres. In general, between 5 per cent and 40 per cent of such fibres are used, these synthetic fibres being capable of being melted so as to bind the separators together. Another technique for binding together two separators consists in compressing them at certain places until they are bound to each other. These separators contain between 5 per cent and 40 per cent by weight of synthetic fibres which can be melted by the application of heat or which may be deformed during the compression.

This technique is known through the French patent FR 2677672.

The aim of the present invention is to propose a glass microfibre separator for batteries having better mechanical properties than traditional glass microfibre separators for batteries.

For this purpose, the invention proposes an absorbent separator for lead-acid accumulators regulated by a valve, characterised in that it comprises a first layer, a second layer and a band of synthetic resin intercalated between the first and the second layer.

Thanks to the band of synthetic resin which covers either the whole or part of a surface of the first layer, the stability of the separator is increased. Such an absorbent separator has a greater tensile strength than that of traditional single-layer glass fibre separators with the same composition of fibres. It has been observed that the tensile strength is considerably increased. For identical microfibre compositions, measurements have shown that the tensile strength may be tripled and change from 0.5 kN/m to 1.5 kN/m. Moreover, the band of synthetic resin makes it possible to obtain an elongation of 4 per cent instead of 1 per cent for similar separators not containing this band. It is therefore possible to use separators manufactured from a relatively fragile material for applications in which some tensile strength is required, such as in automated machines enveloping the electrodes of accumulators.

The synthetic resin is advantageously a thermosetting resin. After drying the separator at a temperature of approximately 100° C., the resin loses water and forms a very strong plastic film capable of welding together the layers of the separator. In addition, this resin makes it possible to weld together two distinct separators, placed over each other to form pockets in which electrodes may be inserted. The welding may be achieved for example by mechanical means, by heating, etc.

According to an advantageous embodiment, the band of resin comprises an acrylic resin, preferably butyl acrylate.

The band of synthetic resin preferably comprises fibres consisting of glass microfibres saturated with resin.

The thickness of this band of resin may vary between 0.01 mm and 1 mm. It lies preferably between 0.05 mm and 0.15 mm.

The bands of synthetic resin have a width which is chosen as a function of the width of the separator. In general, the band has a width that is relatively small compared with the total width of the separator. Normally, it lies between 1 and 20 mm and preferably between 3 mm and 10 mm.

The band may either be a single piece or be subdivided in length to form two or more bands. In general, the width of the band of resin lies between 1 mm and 20 mm, and preferably between 3 mm and 10 mm.

The glass microfibre layers may be identical or different. The layers of the separator comprise glass fibres with a mean diameter of between 0.2 μm and 13 μm. A typical composition for each layer is as follows: 0 per cent to 60 per cent glass fibres with a mean diameter smaller than 1 μm (0.2 μm to 0.8 μm). 0 per cent to 70 per cent glass fibres with a mean diameter lying between 1 μm and 10 μm (2 μm to 4 μm), and 5 per cent to 10 per cent glass fibres with a mean diameter lying between 10 μm and 13 μm.

The composition of each layer may vary according to the desired characteristics of the separator. The two layers may be either identical or different.

According to another preferred embodiment, the first layer of the separator comprises more than 50 per cent glass fibres with a mean diameter of less than 1 micron.

The fibres of the first layer preferably have a mean diameter greater than 0.4 microns.

Advantageously, the thickness of the first layer lies between 20 and 50 per cent of the total thickness of the separator. The ratio between the weights of the fine fibres and coarse fibres may vary between 20 and 50 per cent of the total weight of the separator.

The second layer preferably comprises more than 50 per cent glass fibres with a mean diameter greater than 1 micron. Preferably, the second layer of the separator comprises more than 90 per cent of glass fibres with a mean diameter greater than 1 micron.

In a preferred embodiment of the invention, the said second layer also comprises glass fibres with a mean diameter>5 microns.

According to another aspect of the present invention, it is also proposed to manufacture an absorbent separator for batteries, including lead-acid accumulators regulated by a valve, by a method in which a lower layer is deposited on a support, a band of synthetic resin is distributed over this layer and an upper layer is then deposited on the said band of resin and in which the layers are compressed so that they remain bound to each other.

According to an advantageous embodiment, the said lower layer essentially comprises fibres with a mean diameter greater than 1 micron and the said upper layer essentially comprises fibres with a mean diameter less than 1 micron.

Because of the greater porosity of the layer comprising fibres with a mean diameter greater than 1 micron, the binding of the band of resin is improved.

Preferably, fibres mixed with water are successively deposited on a mat permeable to water. After having deposited the second layer of fibres, the separator is compressed so as to bind the superimposed layers and is then dried.

Other characteristics of the invention are described, in a non-limiting fashion, in the examples below and in relation to the figures in which:

BRIEF DESCRIPTION OF THE DRAWINGS

A FIG. 1 shows a multilayer separator 10 comprising a first layer essentially containing fibres with a mean diameter less than 1 micron, a second layer essentially containing fibres with a mean diameter greater than 1 micron and two bands 12 made of synthetic resin intercalated between the first and second layers. In the case represented in FIG. 1, the bands 12 are placed on the sides of the separator 10 so as to reinforce the lateral edges of the said separator. The bands 12 both have a thickness of about 0.1 mm and a width lying between 3 and 10 mm. They are made of acrylic resin and reinforce the separator 10.

FIG. 2 is a diagrammatic representation of the manufacture of a multilayer separator.

Figure 1:
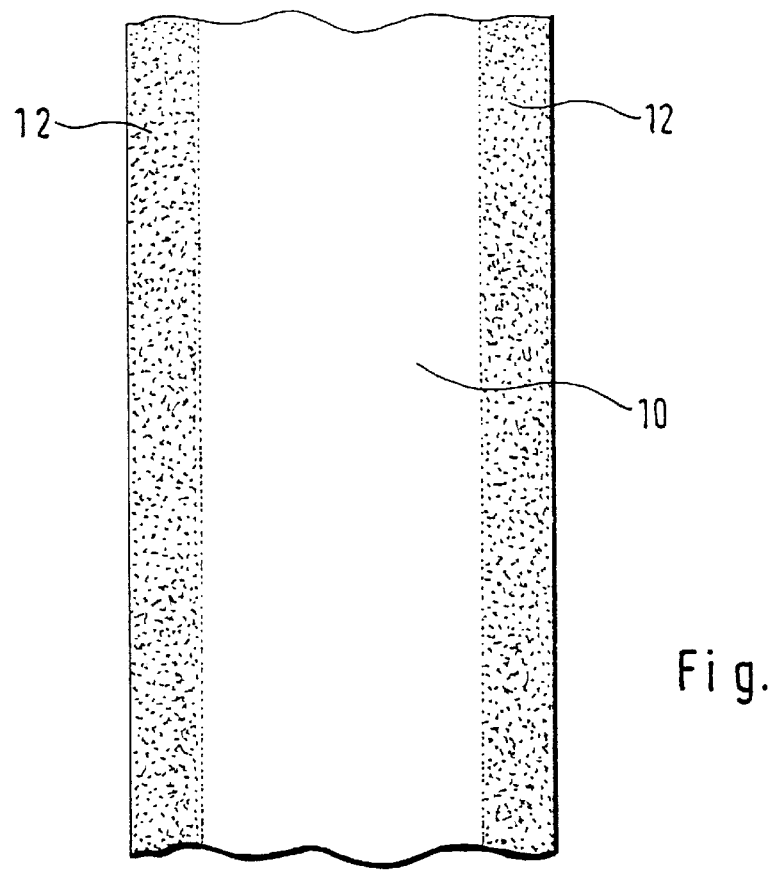
FIG. 1 shows a separator comprising two bands of synthetic resin.
Figure 2:
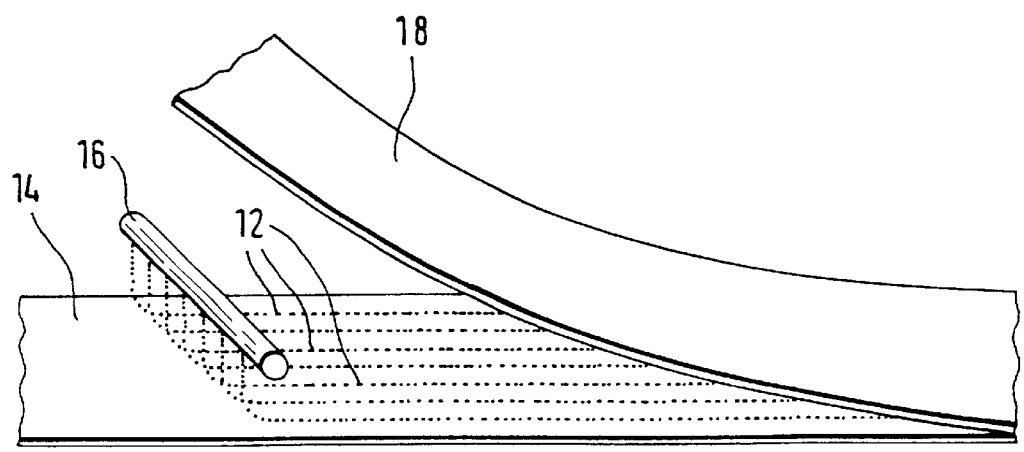
FIG. 2 is a diagram showing the manufacture of a multilayer separator reinforced by the deposition of an acrylic resin dressing.

A lower layer 14, essentially comprising fibres with a mean diameter lying between 0.2 μm and 13 μm, is deposited on a support (not represented). At least one band 12 of synthetic resin is then deposited by means of a distributor 16 in the form of a viscous liquid on a part of the said first layer 14, and a second layer 18 essentially comprising fibres with a mean diameter lying between 0.2 μm and 13 μm is then deposited on the lower layer 14 and on the band of resin 12.

The fibres are mixed with some water, then deposited on a mat permeable to water. After the deposition of the two layers and the band, the separator is compressed by means of a roller (not represented) in order to expel the surplus water and bind together the layers and the band or bands. The reinforcement of the separator by the bands of resin increases the tensile strength still further. It changes from about 0.5 kN/m to 1.5 kN/m.

The elongation is also greatly enhanced, changing from 1 per cent to about 4 per cent.

The values of the tensile strength have been determined by methods well known in industries producing separators and in the paper-making industry. The present measurements were made using tests established by the BCI (Battery Council International), reference Tappi T495. Briefly, this test involves placing a band measuring 25 mm by 150 mm between two jaws 102 mm (4 inches) apart. The band is stretched during the test at a rate of 25±5 mm/min. The breaking strength is measured in newtons and the breaking point together with the elongation at the breaking point are also determined.

A tested separator sample without resin has exhibited a breaking strength of 5 N, while a tested separator sample comprising a band of resin according to the present invention has exhibited a breaking strength of 37.5 N. Since the sample in question had a width of 25 mm, this is equivalent to a tensile strength of 1.5 kNim.

What is claimed is:

1. Absorbent separator for lead-acid accumulators regulated by a valve, comprising
    a first layer of glass fibres having a first surface,
    a second layer of glass fibres having a second surface that faces said first surface, and
    at least one band of synthetic resin intercalated between the first and second layers and binding said first and second layers together;
    wherein said first and second surfaces comprise one or more portions that are not covered by said synthetic resin.
2. Separator according to claim 1, wherein the band of resin comprises butyl acrylate.

3. Separator according to claim 1, wherein the band comprises glass fibres saturated with resin.

4. Separator according to claim 1, wherein the thickness of the band of resin lies between 0.01 mm and 1 mm.

5. Separator according to claim 1, wherein the width of the band of resin lies between 1 and 20 mm.

6. Separator according to claim 1, wherein the first layer comprises more than 50 per cent of glass fibres with a mean diameter of less than 1 micron.

7. Separator according to claim 1, wherein the glass fibres of the first layer have mean diameter greater than 0.4 microns.

8. Separator according to claim 1, wherein the thickness of the first layer lies between 20 and 50 per cent of the total thickness of the separator.

9. Separator according to claim 1, wherein the second layer comprises more than 50 per cent of glass fibres with a mean diameter greater than 1 micron.

10. Separator according to claim 1, wherein the second layer also comprises glass fibres having a mean diameter >5 microns.

11. Method of manufacturing a separator according to claim 1, comprising depositing a first layer comprising fibres on a support, depositing at least one band of synthetic resin on the said first layer, and depositing a second layer comprising fibres on said band of resin and compressing the layers so that they remain bound to each other.

12. Method of manufacturing a separator according to claim 11, wherein the band of synthetic resin is deposited in the form of a viscous liquid spread over the first layer of fibres.

13. Method of manufacturing a separator according to claim 11, wherein the fibres are mixed with water and deposited on a mat permeable to water.

14. Separator according to claim 1, wherein the thickness of the band of resin lies between 0.05 mm and 0.15 mm.

15. Separator according to claim 1, wherein the width of the band of resin lies between 3 mm and 10 mm.

* * * * *

UNITED STATES PATENT AND TRADEMARK OFFICE
CERTIFICATE OF CORRECTION

PATENT NO.    : 6,319,629 B1  
DATED         : November 20, 2001  
INVENTOR(S)   : de M. Ferreira Page 1 of 1

It is certified that error appears in the above-identified patent and that said Letters Patent is hereby corrected as shown below:

<u>Title page,</u>  
Item [30], Foreign Application Priority Data information should read:

-- [30]    Foreign Application Priority Data

Oct. 15, 1997   (LU) ………………………………….. 90 149 --

Signed and Sealed this

Eleventh Day of June, 2002

*Attest:*

*Attesting Officer*

JAMES E. ROGAN  
*Director of the United States Patent and Trademark Office*